United States Patent [19]

Lin

[11] Patent Number: 5,123,945
[45] Date of Patent: Jun. 23, 1992

[54] DUST COLLECTING CONTAINER FOR A DUST COLLECTOR

[76] Inventor: Pi-Hui Lin, No. 40-1, Hsi Ti Liao, Hsiu Lin Village, Min Hsiung Hsiang, Chia I Hsien, Taiwan

[21] Appl. No.: 791,180

[22] Filed: Nov. 12, 1991

[51] Int. Cl.⁵ ............................................. B01D 45/12
[52] U.S. Cl. ........................................ 55/395; 55/429; 55/459.1
[58] Field of Search .................... 55/395, 429, 459.1, 55/467

[56] References Cited

U.S. PATENT DOCUMENTS

| | | | |
|---|---|---|---|
| 1,170,438 | 2/1916 | Fahrney | 55/429 X |
| 2,911,730 | 11/1959 | Schaub et al. | 55/429 X |
| 3,535,854 | 10/1970 | Taylor | 55/459.1 X |
| 4,643,748 | 2/1987 | Dyson | 55/429 X |

Primary Examiner—Charles Hart
Attorney, Agent, or Firm—Bacon & Thomas

[57] ABSTRACT

A dust collecting container attached to the tapered casing of a dust collector for collecting dust taken therein through a suction hose by means of the operation of a forced-draft fan permitting clean air current to be exhausted to the outside through an exhaust pipe, said dust collecting container having an inlet hole at the top connected the peripheral bottom edge of said tapered casing, through which dust is collected inside said dust collecting container, and a conical flange projecting downwards inwards for guiding dust from said inlet hole into the holding space inside said dust collecting container and for prohibiting dust from floating out of said dust collecting container.

1 Claim, 2 Drawing Sheets

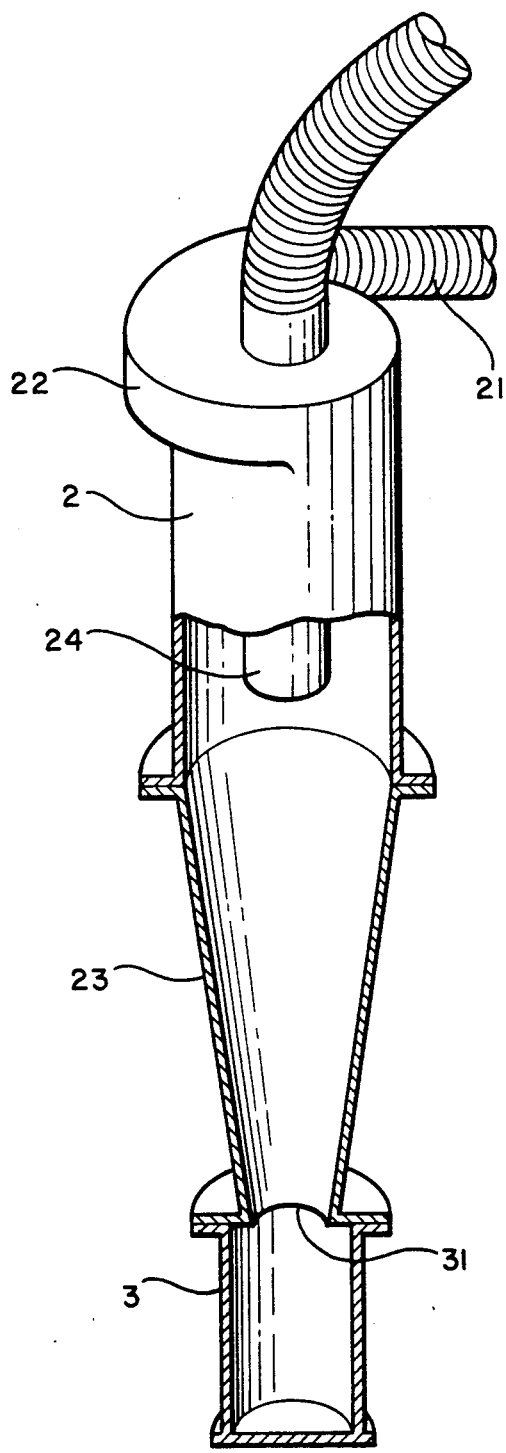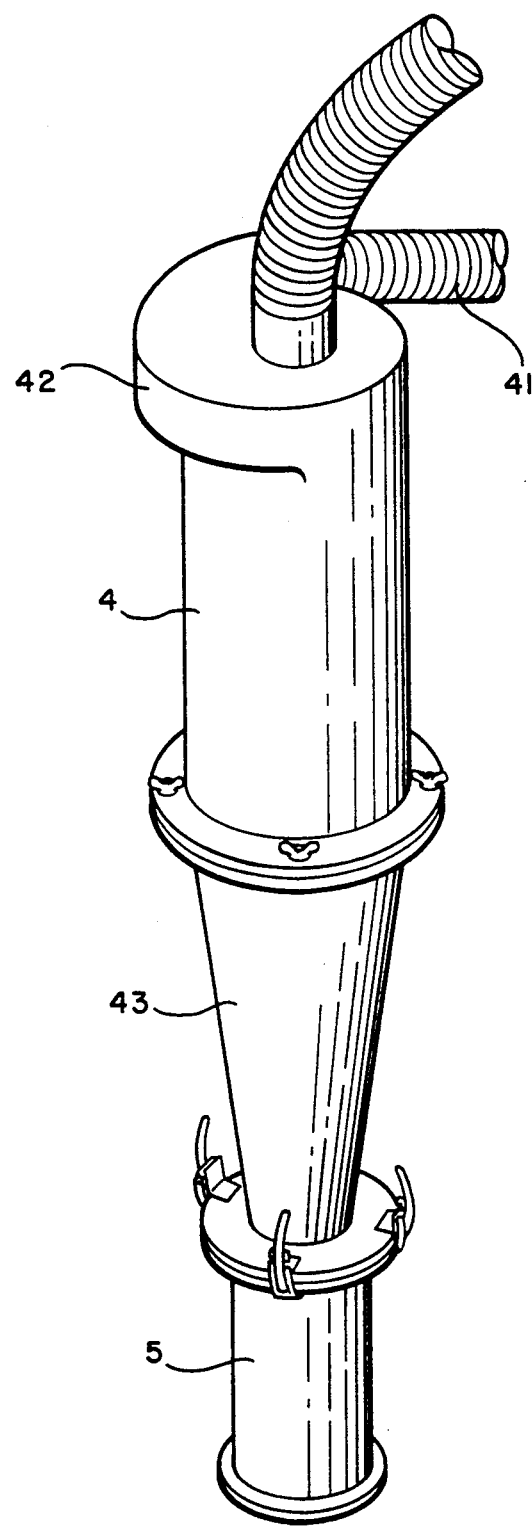
Fig. 1
Fig. 2

DUST COLLECTING CONTAINER FOR A DUST COLLECTOR

BACKGROUND OF THE INVENTION

1. Field of the Invention

The present invention relates to a dust collecting container for a dust collector which has means to prohibit collected dust from floating out so that only clean air current is exhausted out of the dust collector.

2. Description of the Prior Art

In a surface treating job-site, the ambient air may be frequently contaminated with dust or coating material to threaten the health of the operators or cause environmental pollution problem. Therefore, suitable dust cleaning equipment must be used to remove the dust from the air so as to keep the air fresh. FIG. 1 illustrates a dust collector for this purpose. In this structure of dust collector 2, a forced-draft fan (not shown) is fastened inside the top 22 of the dust collector 2 to induce a suction force for sucking outside dust into a tapered casing 23 through a suction hose 21, a dust collecting container 3 is attached to the bottom edge of said tapered casing 23 for collecting dust through an inlet hole 31, and an exhaust pipe 24 is fastened at the inside for discharging air current to the outside. The inlet hole 31 on the top of the dust collecting container 3 is directly attached to the bottom edge of the tapered casing 23 for the passing therethrough of the dust that has been sucked into the tapered casing 23. During the operation of the forced-draft fan, any collected dust in the dust collecting container 3 may be caused to float out of the dust collecting container 3 into the tapered casing 23 from which the floating dust may be exhausted to the outside through the exhaust pipe 24.

SUMMARY OF THE INVENTION

The present invention has been accomplished to eliminate the aforesaid problem. It is therefore the main object of the present invention to provide a dust collecting container for collecting dust from a dust collector which has means to prohibit the dust which has been taken therein from floating out the dust collecting container, so that only clean air current will be exhausted out of the dust collector.

According to the present invention, a dust collecting container has an inlet hole at the top attached to the tapered casing of a dust collector through which dust fall into the holding space inside the dust collecting container, and a conical flange projecting downwards inwards around the said inlet hole to guide dust from said inlet hole into the holding space inside the dust collecting container and simultaneously to prohibit dust from floating out of the dust collecting container.

BRIEF DESCRIPTION OF THE DRAWINGS

The foregoing and other objects, features and advantages of the present invention will be best understood from the following description, the appended claims and the accompanying drawings in which:

FIG. 1 is a schematic sectional view of a dust collector according to the prior art;

FIG. 2 is an elevational view of a dust collector as constructed according to the present invention;

DETAILED DESCRIPTION OF THE PREFERRED EMBODIMENT

Figure 3:
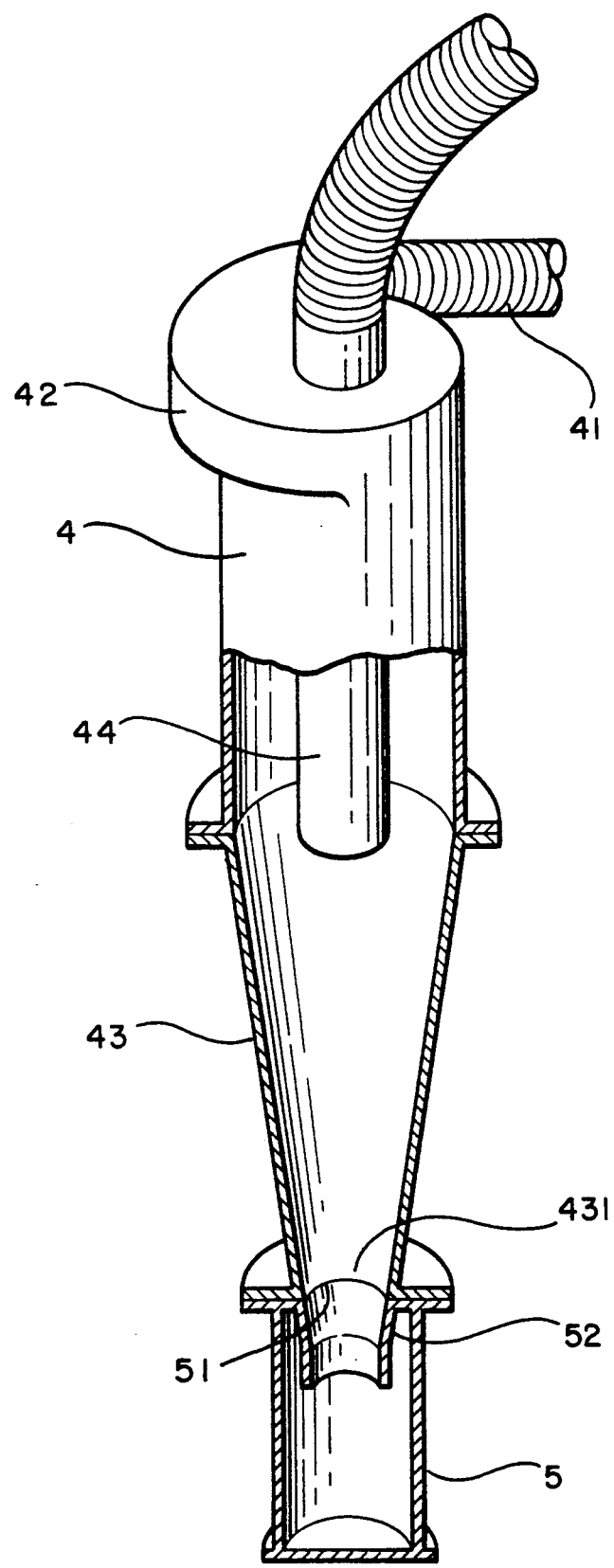
FIG. 3 is a sectional elevational view of the dust collector of FIG. 2, showing the internal structure of the dust collecting container thereof.

Referring to FIGS. 2 and 3, a dust collector 4 comprises a top 42, a forced-draft fan fastened inside said top 42, a suction hose 41 connected to said forced-draft fan through which outside dust is sucked, a tapered casing 43 extending downward from said top 42, an exhaust pipe 44 at the middle inside with one end extending to the outside for exhaust of air current, and a dust collecting container 5 attached to said tapered casing 43 at the bottom for collecting dust sucked through said suction hose 41. The dust collecting container 5 has an inlet hole 51 at the top connected to the terminal end 431 of the tapered casing 43 and a conical flange 52 projecting downwards inwards around said inlet hole 51.

When in use, the dust collector is fastened in place at a surface treading job-site with the dust collecting container 5 firmly secured to the terminal end 431 of the tapered casing 43. Once electric power supply is connected, the forced-draft fan is turned on to suck outside dust into the tapered casing 43 and the dust collecting container 5 through the suction hose 41. Because the conical flange 52 is attached to the bottom edge of the terminal end 431 of the tapered casing 43, floating dust inside the dust collecting container 5 is prohibited from floating out of the dust collecting container 5. Therefore, only clean air is exhausted through the exhaust pipe 44.

I claim:

1. A dust collecting container attached to the tapered casing of a dust collector to collect dust sucked therein through a suction hose by means of the operation of a forced-draft fan permitting clean air current to be exhaust to the outside by an exhaust pipe, characterized in that said dust collecting container has an inlet hole at the top connected the peripheral bottom edge of said tapered casing, through which dust is collected inside said dust collecting container, and a conical flange projecting downwards inwards for guiding dust from said inlet hole into the holding space inside said dust collecting container and for prohibiting dust from floating out of said dust collecting container.

* * * * *